(12) United States Patent
Martin (10) Patent No.: US 11,936,148 B2
(45) Date of Patent: Mar. 19, 2024

(54) MECHANICAL GROUNDING CLAMP

(71) Applicant: Hubbell Incorporated, Shelton, CT (US)

(72) Inventor: Evan Ronald Martin, Merrimack, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/012,768

(22) Filed: Sep. 4, 2020

(65) Prior Publication Data

US 2021/0075128 A1    Mar. 11, 2021

Related U.S. Application Data

(60) Provisional application No. 62/896,948, filed on Sep. 6, 2019.

(51) Int. Cl.
| | | |
|---|---|---|
| *H01R 4/38* | (2006.01) | |
| *H01R 4/2407* | (2018.01) | |
| *H02S 30/00* | (2014.01) | |

(52) U.S. Cl.
CPC ............ *H01R 4/38* (2013.01); *H01R 4/2407* (2018.01); *H02S 30/00* (2013.01)

(58) Field of Classification Search
None
See application file for complete search history.

(56) References Cited

U.S. PATENT DOCUMENTS

| 5,888,104 | A | * | 3/1999 | Mello | .................. E04F 15/024 |
| | | | | | 439/100 |
| 5,928,006 | A | | 7/1999 | Franks, Jr. | |
| 9,689,411 | B2 | | 6/2017 | Meine | |
| 9,837,955 | B1 | | 12/2017 | Schuit | |
| 9,985,361 | B2 | | 5/2018 | Martin | |
| 2017/0170579 | A1 | | 6/2017 | Martin | |
| 2017/0179621 | A1 | | 6/2017 | Martin | |
| 2017/0359020 | A1 | | 12/2017 | Andrews | |
| 2019/0222169 | A1 | | 7/2019 | Yang | |

OTHER PUBLICATIONS

ModuRack Bull Clamp Data Sheet; ; www.modurack.com; May 25, 2018; p. 1.
International Search Report and Written Opinion mailed in corresponding PCT/US2020/049450 dated Dec. 18, 2020 (8 pages).
International Preliminary Report on Patentability mailed in PCT/US2020/049450 dated Mar. 17, 2022 (7 pages).
Communication pursuant to Rules 70(2) and 70a(2) EPC mailed in corresponding EP 20861123.6 dated Jul. 25, 2023 (8 pages).

* cited by examiner

*Primary Examiner* — Felix O Figueroa
(74) *Attorney, Agent, or Firm* — Wissing Miller LLP (57) ABSTRACT

Bonding clamps used to assemble photovoltaic (PV) arrays and provide an electrical bond between PV module frames and a rail system forming the PV arrays are described. The bonding clamp includes an electrically conductive body, first and second compression arms extending from body and a tab extending from the body in a direction away from a bottom side of the body. The first and second compression arms extend at an angle relative to the body.

23 Claims, 8 Drawing Sheets

MECHANICAL GROUNDING CLAMP

CROSS REFERENCE TO RELATED APPLICATIONS

The present disclosure is based on and claims benefit from U.S. Provisional Patent Application Ser. No. 62/896,948 filed on Sep. 6, 2019 entitled "Mechanical Grounding Clamp" the entire contents of which are incorporated herein by reference.

BACKGROUND

Field

The present disclosure relates generally to clamps for securing and bonding structures, and more particularly to mechanical clamps used to secure photovoltaic module frames to rail systems while providing an electrical bonding between the frames and rail systems.

Description of the Related Art

Photovoltaic arrays are typically composed of a number of photovoltaic modules set within a metallic frame, and a rail system that supports the photovoltaic modules. When installing a photovoltaic array, a number of photovoltaic modules are assembled onto a larger mounting structure, sometimes called rails or racking structures. The metallic frames of the individual photovoltaic modules, and the structural pieces, e.g., the rails, on which the modules mount are generally made out of aluminum, which is typically anodized to resist corrosion. Although the frames of the photovoltaic modules are directly bolted or clamped to the rails, the anodizing insulates the metal structures so that they may not be electrically bonded, unless measures are taken to electrically bond them.

Like other sources of electrical power, to ensure safety, the metal frames of the photovoltaic modules and the metal rails on which they are secured are often required by national or local electrical codes to be electrically bonded. Electrically bonded is used here in the technical sense to mean forming an electrically conductive path between the metal structures to ensure electrical continuity between the metal structures sufficient to safely conduct any electrical current imposed on the metal structures.

To electrically bond the metal structures, a common practice in the industry is to install a separate grounding lug on each piece that is anodized, or a separate grounding washer between anodized metal structures. A grounding lug is attached to the sheet metal frame of the photovoltaic modules with a thread forming stainless steel screw. Since the screw cuts into the aluminum it forms a connection which can maintain an electrical bond over time. However, a common sheet metal thickness is fairly thin, e.g., 0.080 inch, and a common screw size is 10-32 so that the screw therefore only makes connection on about 2½ threads, which provides a marginally acceptable surface contact area in terms of mechanical strength and electrical conductivity. Using separate bonding washers between metal structures provides a larger electrical contact area for an improved electrical bonding connection. However, adding grounding lugs or separate bonding washers increases the cost to install photovoltaic arrays, in terms of supplies, and in terms of labor costs to install the separate bonding components.

SUMMARY

The present disclosure provides descriptions of embodiments for mechanical clamps used to assemble photovoltaic (PV) arrays and provide an electrical bond between PV module frames and a PV rail system forming part of the PV arrays. In one exemplary embodiment, the mechanical clamp includes an electrically conductive body, a first compression arm, a second compression arm and a tab. The body has a top side, a bottom side, a first end, a second end, a first side edge and a second side edge. The first compression arm extends from the first side edge of the body and has at least a portion at a first angle relative to the bottom side of the body. The second compression arm extends from the second side edge of the body and has at least a portion at a second angle relative to the bottom side of the body. The tab extends from the first end or the second end of the body in a direction away from the body so that there is a predefined distance between a bottom surface of the tab and the bottom side of the body.

In another exemplary embodiment, the mechanical clamp includes an electrically conductive body, a first compression arm, a second compression arm and a tab. The electrically conductive body has a top side, a bottom side, a first end, a second end, a first side edge, a second side edge and a mounting aperture extending from the top side to the bottom side. The first compression arm is monolithically formed into the body and extends from the first side edge of the body. The first compression arm is preferably at a first angle relative to the bottom side of the body. The second compression arm is monolithically formed into the body and extends from the second side edge of the body. The second compression arm is preferably at a second angle relative to the bottom side of the body. The tab extends from the first end or the second end of the body in a direction substantially perpendicular to the body so that there is a predefined distance between a bottom surface of the tab and the bottom side of the body.

In another exemplary embodiment, the mechanical clamp includes a mounting fastener and an electrically conductive body. The electrically conductive body includes a top side, a bottom side, a first end, a second end, a first side edge, a second side edge and a mounting aperture extending from the top side to the bottom side. A first compression arm extend from the first side edge of the body at a first angle relative to the bottom side of the body. A second compression arm extends from the second side edge of the body at a second angle relative to the bottom side of the body. A tab extends from the first end of the body in a direction substantially perpendicular to the body so that there is a predefined distance between a bottom surface of the tab and the bottom side of the body.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides descriptions of embodiments for mechanical clamps used to assemble photovoltaic (PV) arrays and provide an electrical bond between the PV module frames and rail system forming part of the PV arrays. This specification and the accompanying drawings are to be regarded in an illustrative sense rather than a restrictive sense. Various modifications may be made thereto without departing from the spirit and scope of the present disclosure.

Figure 1:
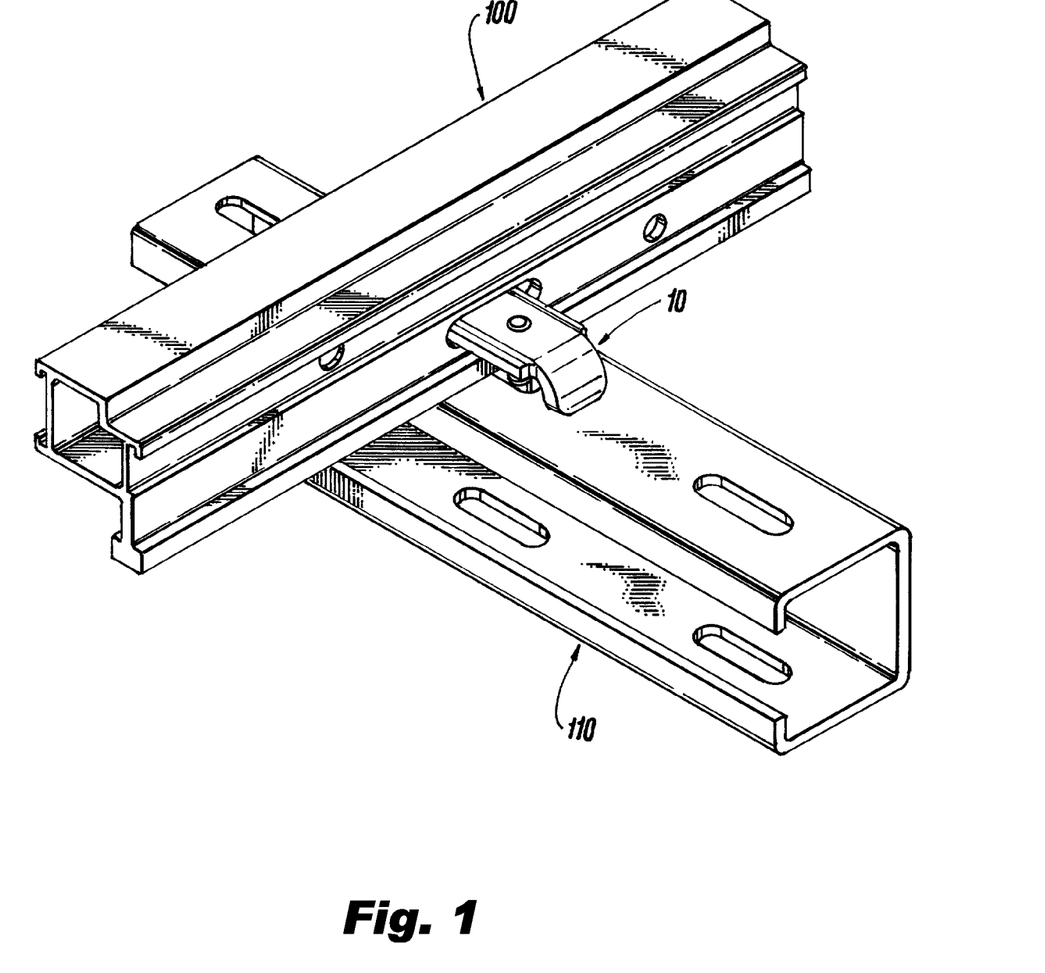
FIG. 1 is a top perspective view of an exemplary embodiment of the mechanical clamp according to the present disclosure securing and bonding a photovoltaic module frame to a rail of a rail system.

Referring to FIG. 1, an exemplary embodiment of the mechanical clamp 10 according to the present disclosure being used as an end clamp securing and bonding a PV module frame 100 to a rail 110 of a rail system is shown. For ease of description, the mechanical clamp 10 may also be referred to herein as the "clamp" in the singular and the "clamps" in the plural. The PV module frame 100 may also be referred to herein as the "frame" in the singular and the "frames" in the plural.

Referring now to FIGS. 2-5, an exemplary embodiment of the clamp 10 according to the present disclosure is shown. In this exemplary embodiment, the clamp 10 includes an electrically conductive body 12 having a top side 12a, a bottom side 12b, a first end 12c, a second end 12d, a first side edge 12e and a second side edge 12f. The body 12 also includes a mounting aperture 14 for receiving a mounting fastener 50. The body 12 includes a first compression wing or arm 16 and a second compression wing or arm 18. The first compression arm 16 extends from the first side edge 12e of the body 12, and the second compression arm 18 extends from the second side edge 12f of the body 12. The compression arms 16 and 18 may be integrally or monolithically formed into the body 12, or the compression arms 16 and 18 may be separate components secured to the body 12 using welds, adhesives or mechanical fasteners.

The mounting aperture 14 may be, for example, a threaded aperture, a clearance aperture or a square aperture. With a threaded aperture, the mounting fastener 50, e.g., a threaded bolt seen in FIG. 2, can be threaded into the threaded mounting aperture 14 to secure the clamp 10 to the frame 100 and the rail 110. With a clearance aperture, the mounting fastener 50, e.g., a threaded bolt, can pass through the aperture 14 and a nut (not shown) can be attach to the neck of the threaded bolt 50 to secure the clamp 10 to the frame 100 and the rail 110. With a carriage bolt, the square neck portion of the carriage bolt 50 can fit within the square aperture 14 and a nut (not shown) can be attach to the threaded portion of the neck of the carriage bolt 50 to secure the clamp 10 to the frame 100 and the rail 110. The mounting fastener 50 is preferably made of an electrically conductive material, such as steel, stainless steel or aluminum.

Figure 2:
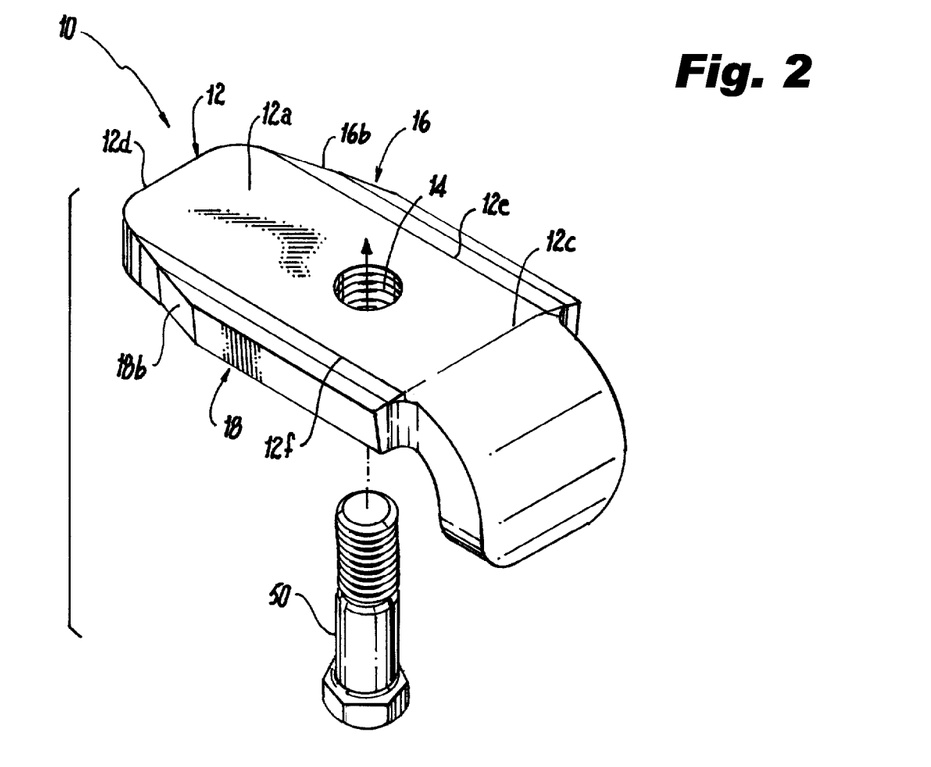
FIG. 2 is a top perspective view of an exemplary embodiment of the mechanical clamp according to the present disclosure, illustrating a bolt used to secure the mechanical clamp to the photovoltaic module frame and rail.
Figure 3:
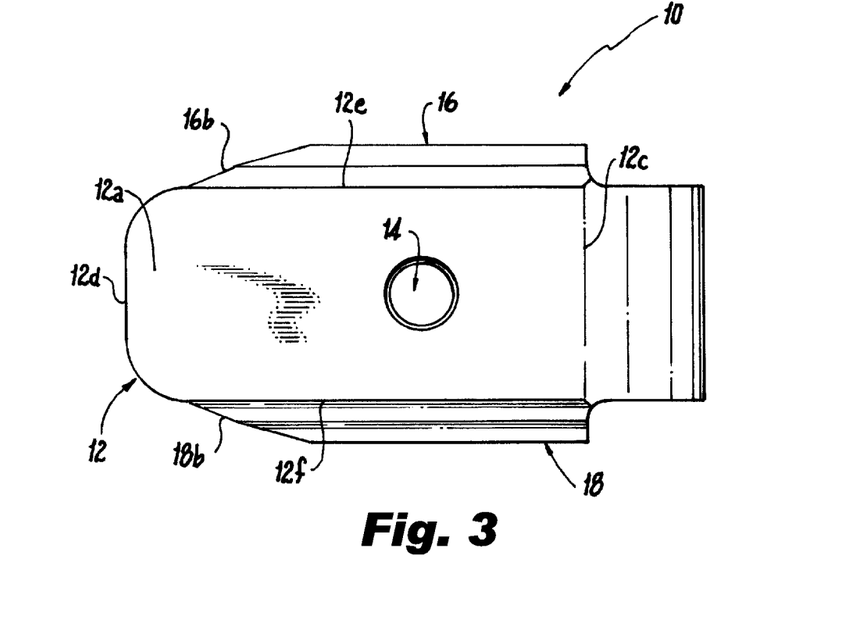
FIG. 3 is a top plan view of the mechanical clamp of FIG. 2.
Figure 4:
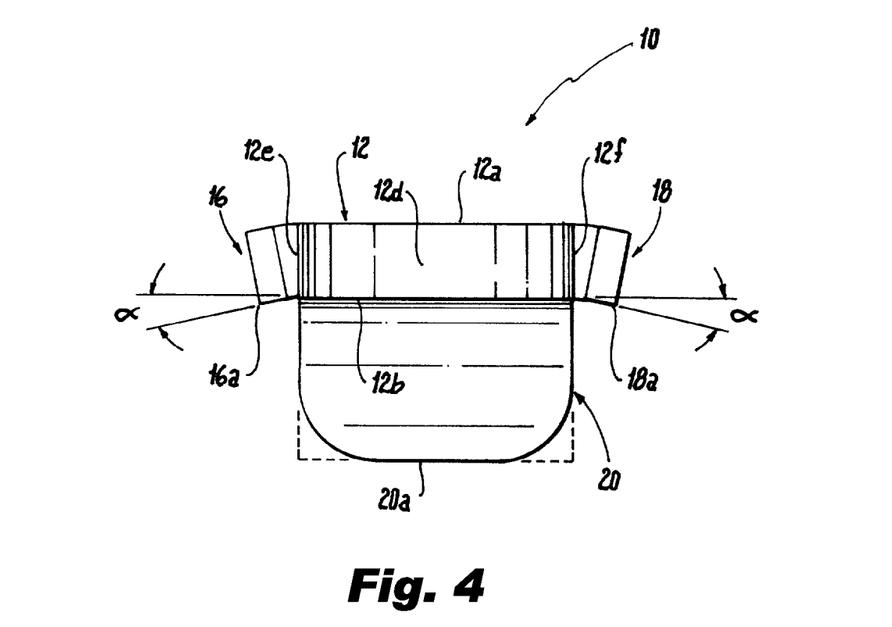
FIG. 4 is a front elevation view of the mechanical clamp of FIG. 2.

Continuing to refer to FIGS. 2-5, the first and second compression arms 16 and 18 extend from their respective side edges 12e or 12f at an angle "α" relative to the respective side edges 12e or 12f, as seen in FIG. 4. The angle "α" may range between about 5 degrees and about 20 degrees and is preferably about 10 degrees. With this angle, the compression arms 16 and 18 can impose a compression force on a frame 100 and/or rail 110 when the mounting fastener 50 is tightened to secure the frame 100 to the rail 110, as described below. In addition, at least a portion, e.g., the corner edges, of the compression arms 16 and 18 form electrical bonding members when the mounting fastener 50 is tightened to secure the frame 100 to the rail 110. More specifically, the corner edge 16a of the first compression arm 16 acts as electrical bonding member that is capable of cutting through or piercing non-conductive coatings 114, seen in FIG. 8A, on the frame 100 that, for example, protect the frames from corrosion. Examples of such non-conductive coatings include oxide, paint and/or anodization. Similarly, the corner edge 18a of the second compression arm 18 acts as electrical bonding member that is capable of cutting through or piercing non-conductive coatings 114, seen in FIG. 8A, on the frame 100 that, for example, protect the frames from corrosion. The forward edges 16b and 18b of the compression arms 16 and 18 may be tapered, as shown in FIG. 3. The tapered edges 16b and 18b facilitate the installation of the clamp 10 into slots within the frame 100, shown in FIGS. 1 and 6.

Figure 5:
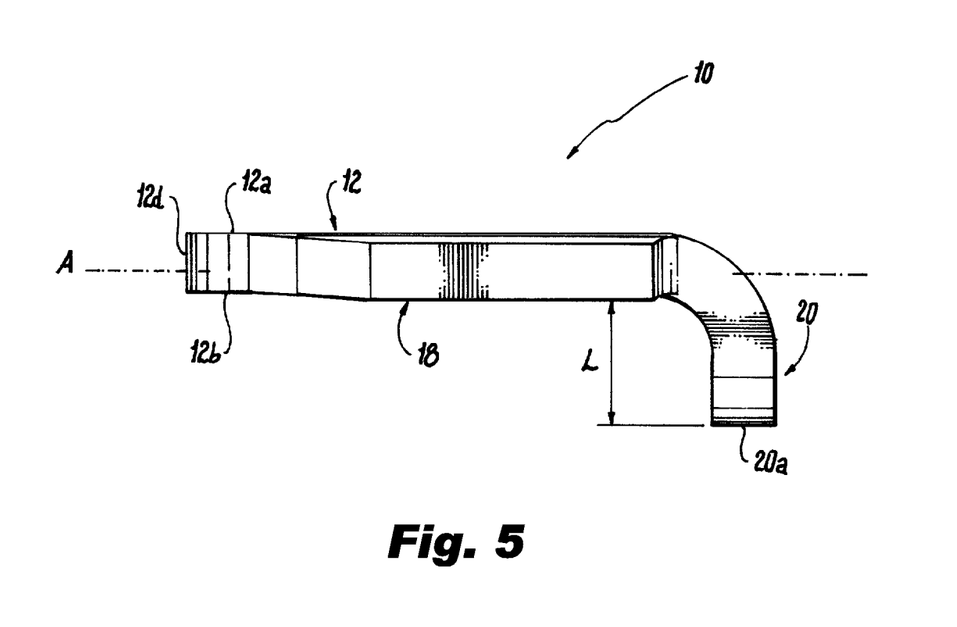
FIG. 5 is a side elevation view of the mechanical clamp of FIG. 2.

Extending from the first end 12c or the second end 12d of the body 12 is a tab 20 that is preferably perpendicular to the longitudinal axis "A" of the body 12, seen in FIG. 5. The tab 20 may be integrally or monolithically formed into the body 12, or the tab 20 may be a separate component secured to the first end 12c or the second end 12d of the body 12 using welds, adhesives or mechanical fasteners. A bottom surface or wall 20a of the tab 20 may include a flat portion with rounded edges, as shown in FIG. 4, or the bottom surface or wall 20a of the tab 20 may include a flat portion with square edges as shown in phantom in FIG. 4. In another exemplary embodiment, the bottom surface or wall 20a of the tab 20 may end in a pointed tip (not shown). The tab 20 has a length "L" that helps to position the clamp 10 relative to the frame 100 when installed. The tab 20 also helps to maintain the orientation of the clamp 10 so that the longitudinal axis "A" of the body 12 is substantially parallel to the rail 110. The length "L" of the tab 20 may be in the range of about 0.25 inches and about 2.5 inches. The tab 20 also stabilizes the body 12 when the mounting fastener 50 secures the clamp 10 to the PV module frame 100 and the rail 110.

The body 12, compression arms 16 and 18 and the tab 20 are made of a material capable of applying sufficient compression force to the frame 100 and the rail 110 to hold the frame 100 in position relative to the rail 110, while also being capable of conducting electricity to provide an electrical bond. As non-limiting examples, the body 12, compression arms 16 and 18 and the tab 20 may be made of stainless steel or other conductive steel, aluminum and/or aluminum alloy.

Installation of the clamp 10 of FIG. 2 will be described with reference to FIGS. 6-8 and 8A. Initially, a frame 100 is placed on a rail 110 so that slot 102 in the frame 100 is positioned in proximity to slot 112 in the rail 110. The second end 12d of the body 12 is then inserted into the slot 102 in the frame 100. It is noted that the tab 20 also acts as a stop to prevent the body 12 from being passed completely through the slot 102. With the body 12 of the clamp 10 partially within the slot 102 in the frame 100, the mounting fastener 50 is then passed through slot 112 in the rail 110 and threaded into the aperture 14 in the body 12. The mounting fastener 50 is then tightened to secure the frame 100 to the rail 110. As the frame 100 is being secured to the rail 110, the corner edge 16a of the first compression arm 16 cuts through or pierces any non-conductive coatings 114 on the edge 102a of the slot 102 in the frame 100, as shown in FIG. 8A, so that the metal of the first compression arm 16 is in electrical contact with the metal of the edge 102a of the slot 102. Similarly, the corner edge 18a of the second compression arm 18 cuts through or pierces any non-conductive coatings 114 on the edge 102a of the slot 102 in the frame 100 so that the metal of the second compression arm 18 is in electrical contact with the metal of the edge 102a of the slot 102. With the clamp 10 in electrical contact with the frame 100 an electrically conductive path exists between the clamp 10 and the frame 100. In addition, a head of the mounting fastener 50 is in electrical contact with the rail 110 so that an electrically conductive path is created between the rail 110 and the mounting fastener 50, and in the exemplary embodiment shown in FIG. 7 an electrically conductive path is created between the clamp 10 and the mounting fastener 50. As a result, an electrically conductive path is created between the frame 100 and the rail 110 which enables the frame to be electrically bonded to the rail.

Figures 9, 10, 11, 12:
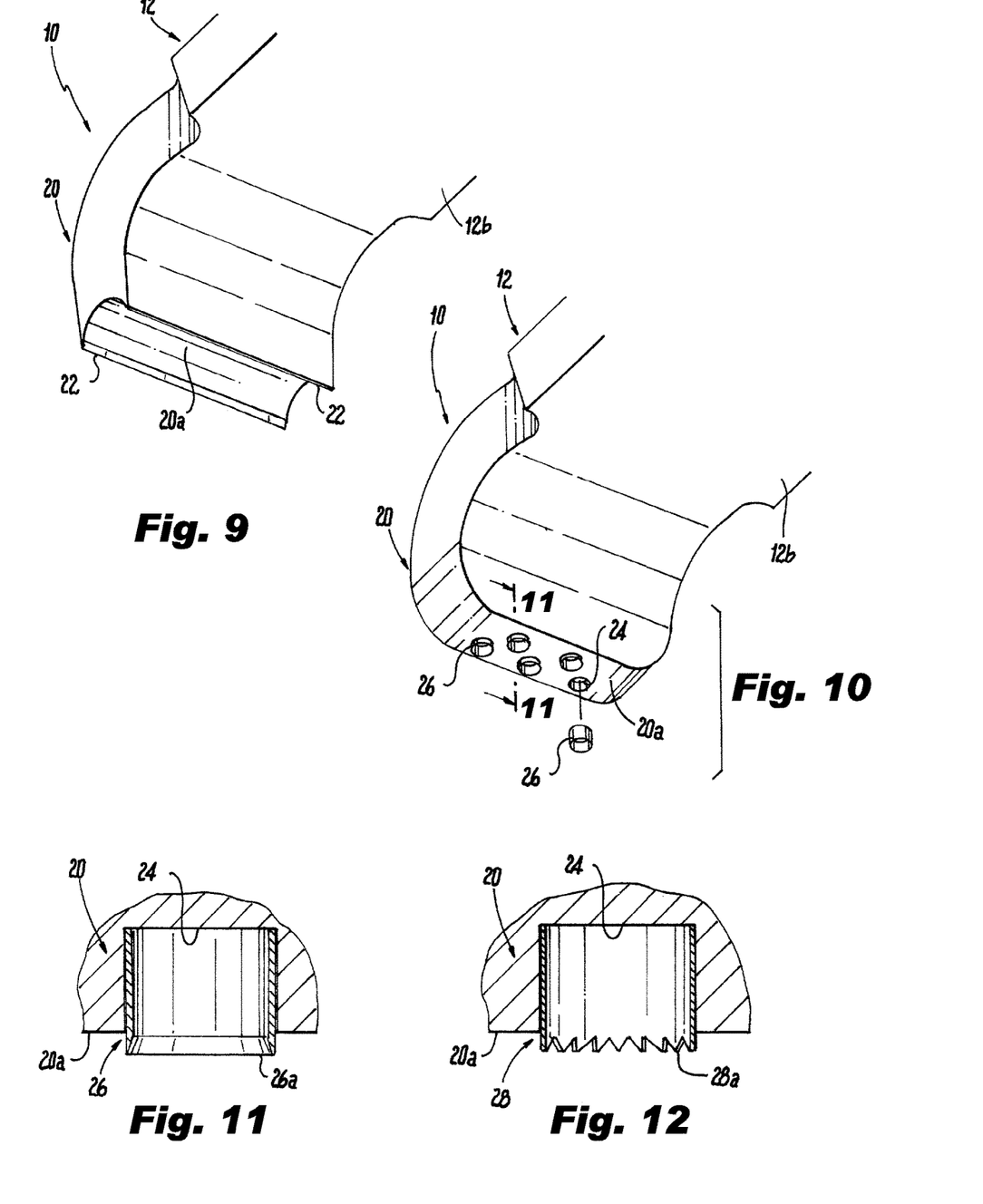
FIG. 9 is a bottom perspective view of another exemplary embodiment of the mechanical clamp according to the present disclosure.
FIG. 10 is a bottom perspective view of another exemplary embodiment of the mechanical clamp according to the present disclosure.
FIG. 11 is a partial cross-sectional view of the mechanical bonding clamp of FIG. 10 taken along line 11-11, illustrating an electrical bonding member for piercing non-conductive coatings on the rail system to facilitate the creation of an electrical bond between the photovoltaic module frame and the rail.
FIG. 12 is a cross-sectional view of another exemplary embodiment of the bonding electrical bonding member for piercing non-conductive coatings on the rail system to facilitate the creation of an electrical bond between the photovoltaic module frame and the rail.

Turning now to FIG. 9 another exemplary embodiment of the clamp according to the present disclosure is shown. In this exemplary embodiment, the clamp 10 includes the electrically conductive body 12 and the electrically conductive tab 20. The electrically conductive body 12 is the same as the body 12 described above and is not repeated. The tab 20 is substantially the same as the tab 20 described above except that the bottom surface or wall 20a of the tab differs. In this exemplary embodiment, the bottom surface or wall 20a is shaped to form at least one electrical bonding member 22 capable of cutting through or piercing non-conductive coatings, similar to the non-conductive coatings 114, on the rail 110. In the exemplary embodiment shown in FIG. 9, the bottom surface or wall 20a of the tab 20 is shaped with a concave surface forming two electrical bonding member 22, each capable of cutting through or piercing non-conductive coatings on the rail 110.

Referring to FIGS. 10-12, another exemplary embodiment of the clamp according to the present disclosure is shown. In this exemplary embodiment, the clamp 10 includes the electrically conductive body 12 and the electrically conductive tab 20. The electrically conductive body 12 is the same as the body 12 described above and is not repeated. The tab 20 is substantially the same as the tab 20 described above except that the bottom surface or wall 20a of the tab differs. In this exemplary embodiment, the bottom surface or wall 20a includes one or more holes 24, each configured and dimensioned to receive an electrical bonding member 26 (seen in FIG. 11) or an electrical bonding member 28 (seen in FIG. 12). In the exemplary embodiment shown in FIG. 11, the electrical bonding member 26 is a tubular member having a tapered distal end forming a cutting edge 26a capable of cutting through or piercing non-conductive coatings on the rail 110. The electrical bonding member 26 may be secured within a respective hole 24 in the bottom surface or wall 20a of the tab 20 by, for example, a press fit to create an electrically conductive path between the electrical bonding member 26 and the tab 20 of the clamp 10. In the exemplary embodiment shown on FIG. 12, the electrical bonding member 28 is a tubular member having a serrated distal end forming a cutting edge 28a capable of cutting through or piercing non-conductive coatings on the rail 110. The electrical bonding member 28 may be secured within a respective hole 24 in the bottom surface or wall 20a of the tab 20 by, for example, a press fit to create an electrically conductive path between the electrical bonding member 28 and the tab 20 of the clamp 10. The inclusion of the electrical bonding members 26 and/or 28 may improve the electrical communication between the clamp 10 and the rail 110 when securing a frame 100 to the rail as described above.

Figure 6:
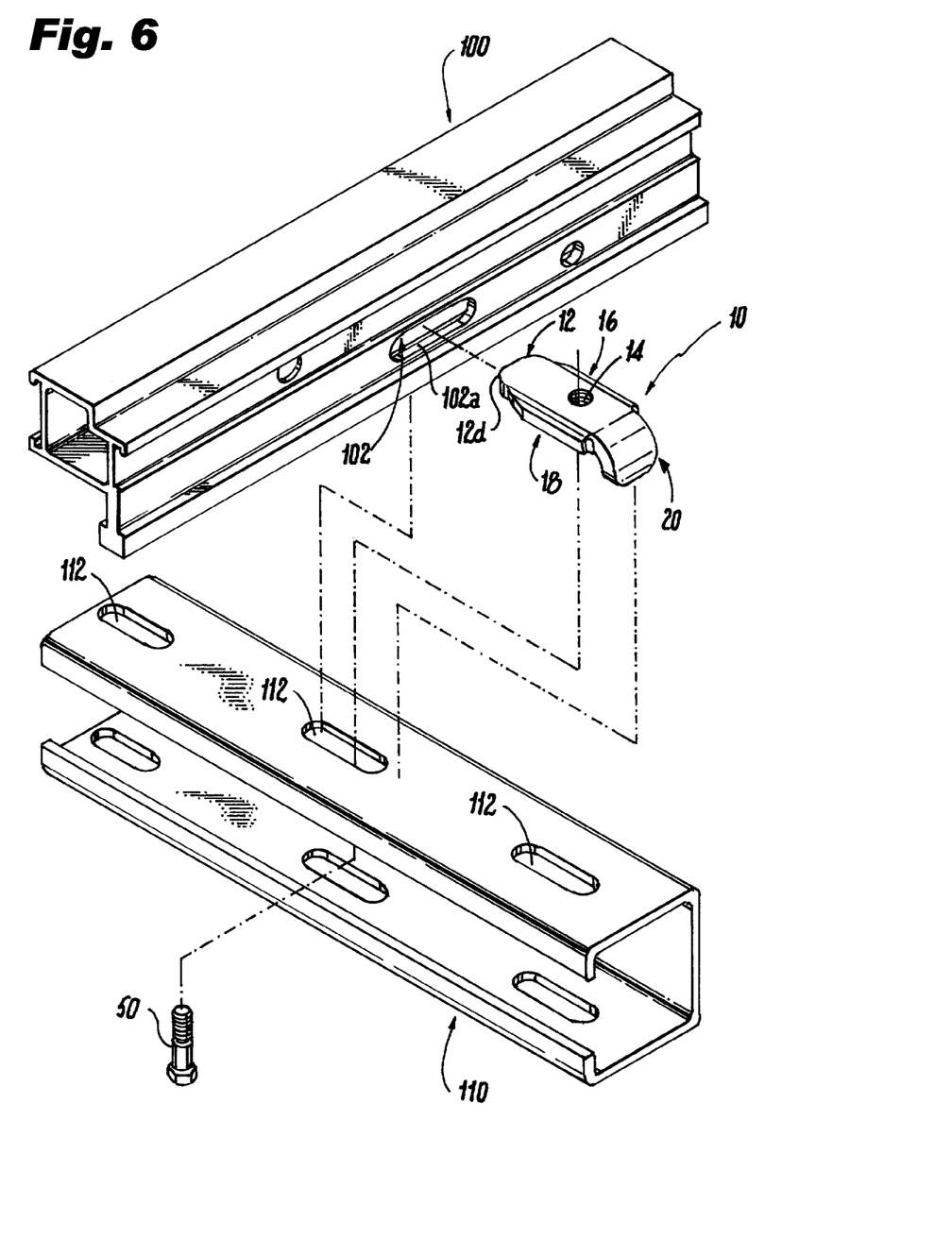
FIG. 6 is a top perspective view, with parts separated, of the mechanical clamp, photovoltaic module frame and rail of FIG. 1.
Figure 7:
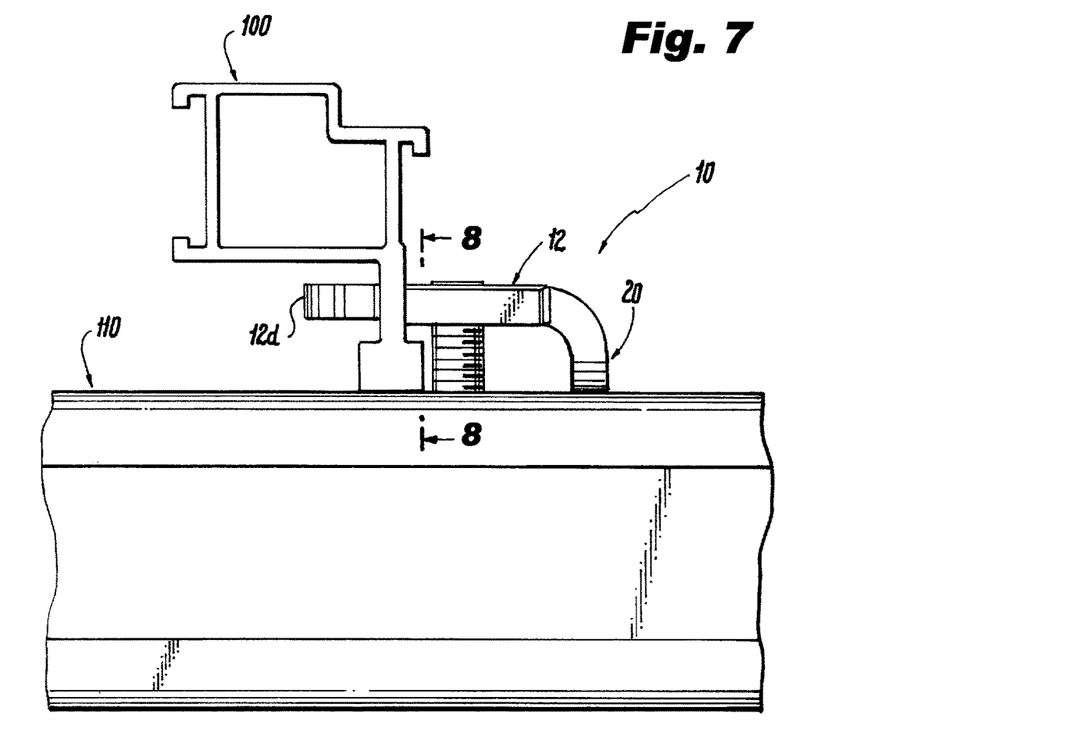
FIG. 7 is a side elevation view of the mechanical clamp, photovoltaic module frame and rail of FIG. 1, illustrating the mechanical clamp securing the photovoltaic module frame to the rail.
Figure 8:
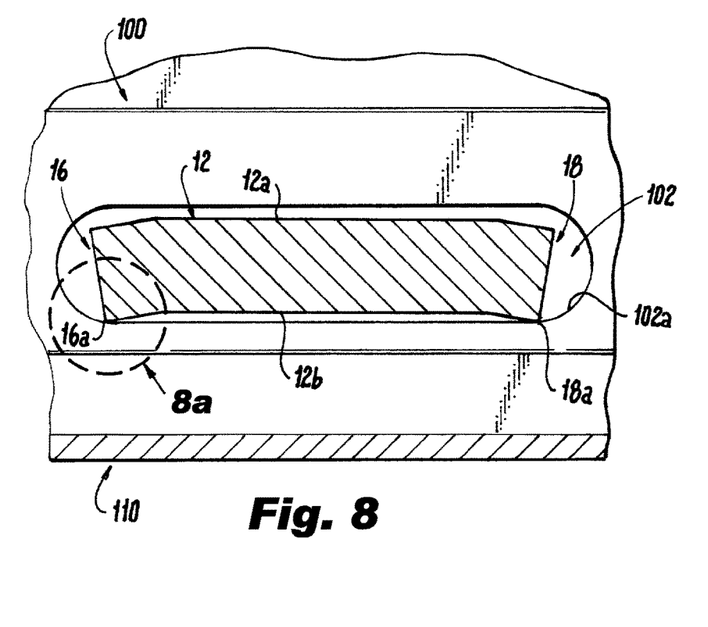
FIG. 8 is a cross-sectional view of the mechanical clamp, photovoltaic module frame and rail system of FIG. 7 taken from line 8-8, and illustrating the mechanical clamp securing the photovoltaic module frame to the rail and cutting into non-conductive coatings on the photovoltaic module frame.
Figure 8A:
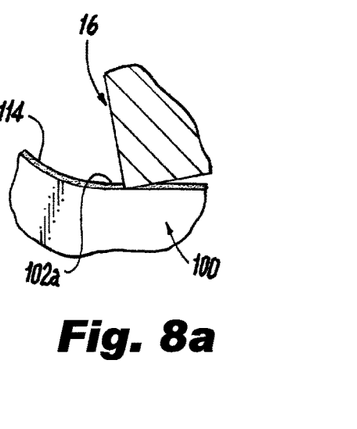
FIG. 8A is an enlarged portion of the mechanical clamp within a slot in the photovoltaic module frame, illustrating an edge of a compression arm of the mechanical clamp cutting into a non-conductive coating on the frame.
Figure 13:
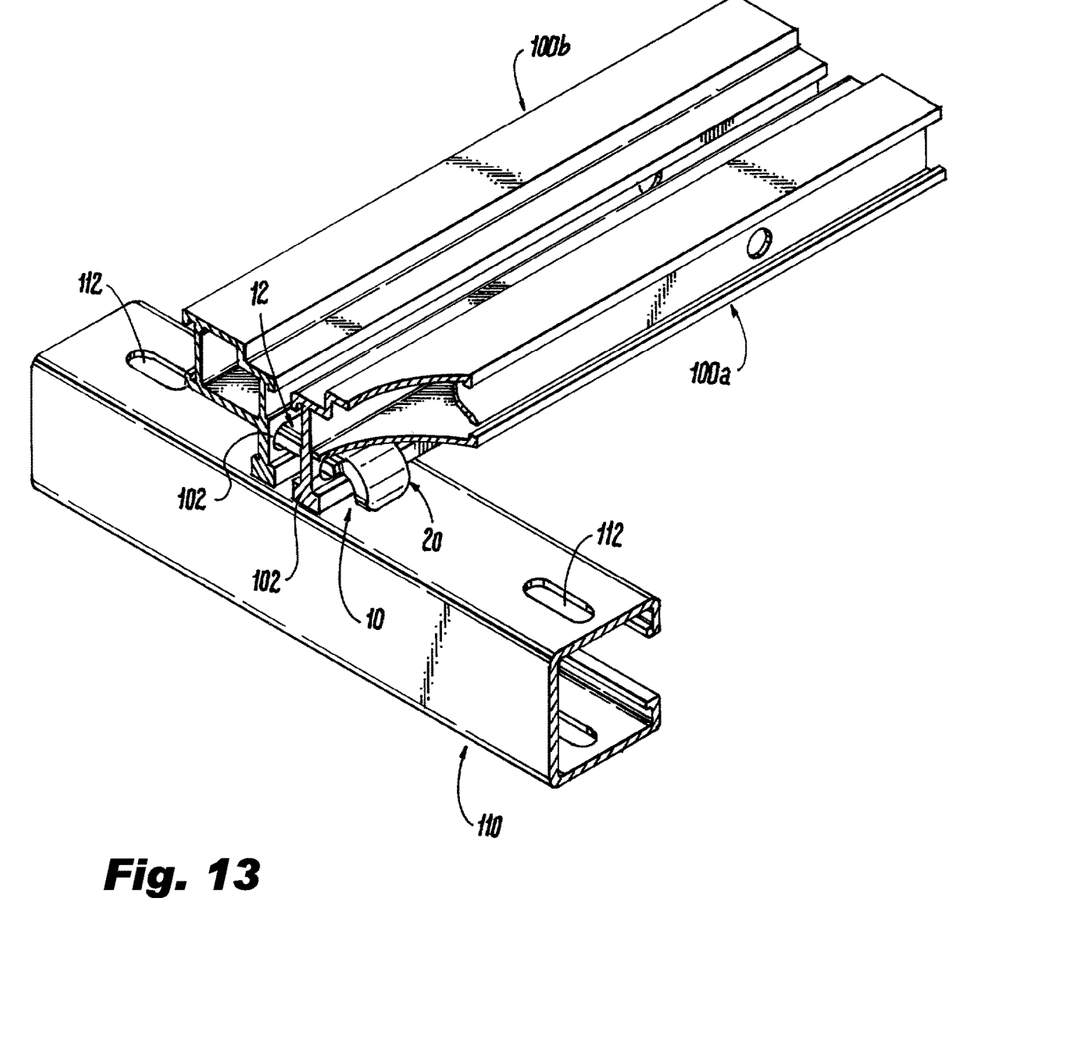
FIG. 13 is a top perspective view of the mechanical clamp of FIG. 2 securing and bonding of two photovoltaic module frames to a rail.
Figure 14:
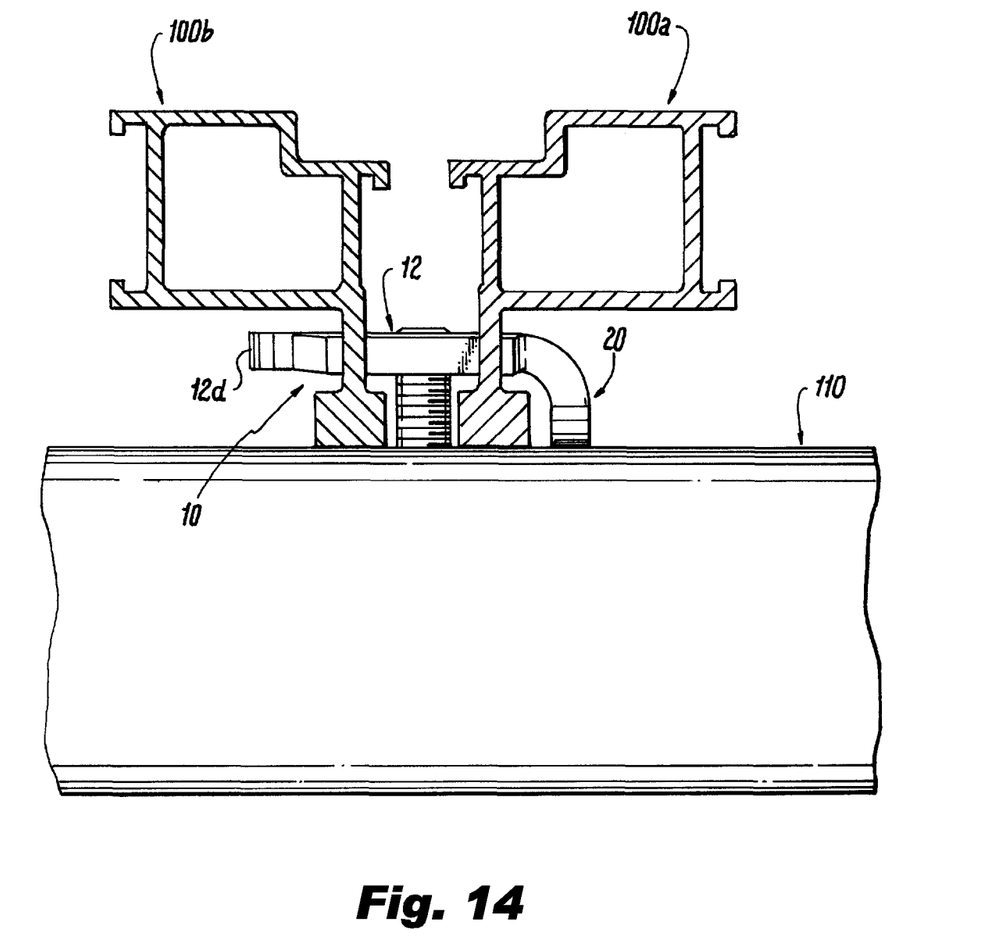
FIG. 14 is an end elevation view of the mechanical clamp, photovoltaic module frame and rail of FIG. 13, illustrating the mechanical clamp securing the two photovoltaic module frames to the rail.

In the exemplary embodiment shown in FIGS. 6-8 the frame 100 is an end frame of a PV array and the clamp 10 is used as an end clamp passing into the slot 102 of the frame 100 from the outside of the frame. In the exemplary embodiment shown in FIGS. 13 and 14, the clamp 10 is used as a mid-clamp securing adjacent frames 100a and 100b to the rail 110. Installation of the clamp 10 as a mid-clamp will be described with reference to FIGS. 13 and 14. Initially, two frames 100a and 100b are placed on a rail 110 so that the slots 102 in each frame 100 are aligned and positioned in proximity to a slot 112 in the rail 110. The second end 12d of the body 12 is then inserted into the slot 102 in the first frame 100a and into the slot 102 in the second frame 100b. It is noted that the tab 20 also acts as a stop to prevent the body 12 from being passed completely through the slots 102. With the body 12 of the clamp 10 partially within the slots 102 in the first and second frames 100a and 100b, the mounting fastener 50 is then passed through slot 112 in the rail 110 and threaded into the aperture 14 in the body 12. The mounting fastener 50 is then tightened to secure the frames 100a and 100b to the rail 110. As the frames 100a and 100b are being secured to the rail 110, the corner edge 16a of the first compression arm 16 cuts through or pierces any non-conductive coatings 114 on the edge 102a of the slot 102 in each frame 100a and 100b so that the metal of the first compression arm 16 is in electrical contact with the metal of the edges 102a of each slot 102, similar to that shown in FIG. 8A. Similarly, the corner edge 18a of the second compression arm 18 cuts through or pierces any non-conductive coatings 114 on the edge 102a of each slot 102 in the frames 100a and 100b so that the metal of the second compression arm 18 is in electrical contact with the metal of the edge 102a of each slot 102. With the clamp 10 in electrical contact with the frames 100a and 100b an electrically conductive path exists between the clamp 10 and the frames. In addition, the head of the mounting fastener 50 is in electrical contact with the rail 110 so that an electrically conductive path is created between the rail 110 and the mounting fastener 50, and in the exemplary embodiment shown in FIG. 14 an electrically conductive path is created between the clamp 10 and the mounting fastener 50. As a result, an electrically conductive path is created between the frames 100a and 100b and the rail 110 which enables the frame to be electrically bonded to the rail.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A bonding clamp comprising:
   an electrically conductive body having a top side, a bottom side, a first end, a second end, a first side edge and a second side edge;
   a first elongated compression arm extending outward from the first side edge of the body, the first compression arm having a length extending along a length of the first side edge from the first end to a point along the body in close proximity to the second end where the first compression arm tapers into the first side edge of the body, the first compression arm having an edge at a first angle relative to the bottom side of the body, the edge of the first compression arm forming a first electrical bonding member;
   a second elongated compression arm extending outward from the second side edge of the body, the second compression arm having a length extending along a length of the second side edge from the first end to a point along the body in close proximity to the second end where the second compression arm tapers into the second side edge of the body, the second compression arm having an edge at a second angle relative to the bottom side of the body, the edge of the second compression arm forming a second electrical bonding member; and
   a tab extending from the first end of the body in a direction away from the body such that there is a predefined distance between a bottom surface of the tab and the bottom side of the body.

2. The bonding clamp according to claim 1, wherein the body includes a mounting aperture extending from the top side of the body to the bottom side of the body.

3. The bonding clamp according to claim 2, further comprising a mounting fastener adapted to mate with the mounting aperture.

4. The bonding clamp according to claim 1, wherein the electrically conductive body is substantially planar.

5. The bonding clamp according to claim 1, wherein the first angle ranges between about 5 degrees and about 20 degrees, and the second angle ranges between about 5 degrees and about 20 degrees.

6. The bonding clamp according to claim 1, wherein the bottom surface of the tab includes at least one electrical bonding member extending therefrom.

7. The bonding clamp according to claim 6, wherein the at least one electrical bonding member extending from the bottom surface of the tab comprises at least one hole in the bottom surface of the tab and the at least one electrical bonding member is positioned within the at least one hole.

8. A bonding clamp comprising:
   an electrically conductive body having a top side, a bottom side, a first end, a second end, a first side edge, a second side edge and a mounting aperture extending from the top side to the bottom side;
   a first elongated compression arm monolithically formed into the body and extending outward from the first side edge of the body, the first compression arm having a length extending along a length of the first side edge from the first end to a point along the body in close proximity to the second end where the first compression arm tapers into the first side edge, the first compression arm having an edge at a first angle relative to the bottom side of the body, the edge forming a first electrical bonding member;
   a second elongated compression arm monolithically formed into the body and extending outward from the second side edge of the body, the second compression arm having a length extending along a length of the second side edge from the first end to a point along the body in close proximity to the second end where the second compression arm tapers into the second side edge, the second compression arm having an edge at a second angle relative to the bottom side of the body, the edge forming a second electrical bonding member; and
   a tab extending from the first end of the body in a direction substantially perpendicular to the body such that there is a predefined distance between a bottom surface of the tab and the bottom side of the body.

9. The bonding clamp according to claim 8, wherein the electrically conductive body is substantially planar.

10. The bonding clamp according to claim 8, wherein the first electrical bonding member is configured to cut through or pierce non-conductive coatings.

11. The bonding clamp according to claim 8, wherein the second electrical bonding member is configured to cut through or pierce non-conductive coatings.

12. The bonding clamp according to claim 8, wherein the first angle ranges between about 5 degrees and about 20 degrees, and the second angle ranges between about 5 degrees and about 20 degrees.

13. The bonding clamp according to claim 8, wherein the bottom surface of the tab includes at least one electrical bonding member extending therefrom.

14. The bonding clamp according to claim 13, wherein the at least one electrical bonding member extending from the bottom surface of the tab comprises at least one hole in the bottom surface of the tab and the at least one electrical bonding member is positioned within the at least one hole.

15. The bonding clamp according to claim 8, wherein the body includes a mounting aperture extending from the top side of the body to the bottom side of the body.

16. A bonding clamp comprising:
   a mounting fastener; and
   an electrically conductive body, including:
      a top side, a bottom side, a first end, a second end, a first side edge, a second side edge and a mounting aperture extending from the top side to the bottom side;

a first elongated compression arm extending outward from the first side edge of the body, the first compression arm having a length extending along a length of the first side edge from the first end to a point along the body in close proximity to the second end where the first compression arm tapers into the first side edge, the first compression arm having an edge at a first angle relative to the bottom side of the body, the edge of the first compression arm forming a first electrical bonding member;

a second elongated compression arm extending outward from the second side edge of the body, the second compression arm having a length extending along a length of the second side edge from the first end to a point along the body in close proximity to the second end where the second compression arm tapers into the second side edge, the second compression arm having an edge at a second angle relative to the bottom side of the body, the edge of the second compression arm forming a second electrical bonding member; and a tab extending from the first end of the body in a direction substantially perpendicular to the body such that there is a predefined distance between a bottom surface of the tab and the bottom side of the body.

17. The bonding clamp according to claim 16, wherein the electrically conductive body is substantially planar.

18. The bonding clamp according to claim 16, wherein the first electrical bonding member is configured to cut through or pierce non-conductive coatings.

19. The bonding clamp according to claim 16, wherein the second electrical bonding member is configured to cut through or pierce non-conductive coatings.

20. The bonding clamp according to claim 16, wherein the first angle ranges between about 5 degrees and about 20 degrees, and the second angle ranges between about 5 degrees and about 20 degrees.

21. The bonding clamp according to claim 16, wherein the bottom surface of the tab includes at least one electrical bonding member extending therefrom.

22. The bonding clamp according to claim 21, wherein the at least one electrical bonding member extending from the bottom surface of the tab comprises at least one hole in the bottom surface of the tab and the at least one electrical bonding member is positioned within the at least one hole.

23. The bonding clamp according to claim 16, wherein the body includes a mounting aperture extending from the top side of the body to the bottom side of the body.

\* \* \* \* \*